(12) United States Patent
Fuwa et al.

(10) Patent No.: US 6,986,330 B2
(45) Date of Patent: Jan. 17, 2006

(54) INTERNAL COMBUSTION ENGINE HAVING VARIABLE VALVE ACTUATION DEVICE AND METHOD OF CALCULATING INTAKE AMOUNT IN THE SAME INTERNAL COMBUSTION ENGINE

(75) Inventors: Naohide Fuwa, Toyota (JP); Akira Ohata, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 10/664,914

(22) Filed: Sep. 22, 2003

(65) Prior Publication Data

US 2004/0250782 A1    Dec. 16, 2004

(30) Foreign Application Priority Data

Sep. 25, 2002    (JP) ............................. 2002-279494

(51) Int. Cl.
*F01L 1/34*    (2006.01)
(52) U.S. Cl. ............................. 123/90.15; 123/90.17; 123/90.16; 701/114
(58) Field of Classification Search ............ 123/90.15, 123/90.17, 90.16, 480; 701/109, 114, 118.2; 73/117.3
See application file for complete search history.

(56) References Cited

U.S. PATENT DOCUMENTS

| 6,328,007 B1 | 12/2001 | Hirasawa et al. | |
|---|---|---|---|
| 6,792,901 B2 * | 9/2004 | Sugiyama et al. | ....... 123/90.15 |
| 2002/0107633 A1 * | 8/2002 | Iwaski et al. | ............... 701/114 |

FOREIGN PATENT DOCUMENTS

| DE | 101 57 659 A1 | | 11/2001 |
|---|---|---|---|
| JP | 04166633 A | * | 6/1992 |
| JP | A 2000-80952 | | 3/2000 |
| JP | A 2001-159323 | | 6/2001 |

* cited by examiner

Primary Examiner—Thomas Denion
Assistant Examiner—Zelalem Eshete
(74) Attorney, Agent, or Firm—Oliff & Berridge, PLC

(57) ABSTRACT

An internal combustion engine has a variable valve actuation device for lifting an intake valve. The device is capable of changing the amount of opening of the intake valve. The device is configured to calculate a first estimated value Gao of the amount of intake air from a parameter regarding the operation state of the engine at the time of opening the intake valve; calculate a second estimated value Gac of the amount of intake air from a parameter regarding the operation state of the engine at the time of closing the intake valve; and calculate an actual amount of intake air Ga based on the first estimated value and the second estimated value.

14 Claims, 8 Drawing Sheets

INTERNAL COMBUSTION ENGINE HAVING VARIABLE VALVE ACTUATION DEVICE AND METHOD OF CALCULATING INTAKE AMOUNT IN THE SAME INTERNAL COMBUSTION ENGINE

INCORPORATION BY REFERENCE

The disclosure of Japanese Patent Application No. 2002-279494 filed on Sep. 25, 2002, including the specification, drawings and abstract is incorporated herein by reference in its entirety.

BACKGROUND OF THE INVENTION

1. Field of the Invention

The invention relates to an internal combustion engine having a variable valve actuation device and a method for calculating an intake amount in the same engine.

2. Description of the Related Art

Japanese Laid opened Patent Application No. JP-2001-159323 discloses a valve actuation device that is provided for lifting intake valves and is capable of varying the amount of opening (the maximum valve lift and the working angle) of the intake valves (hereinafter, the device will be referred to as "variable valve actuation device"). In such variable valve actuation device-equipped engines, the amount of air taken into the combustion chambers (amount of intake air) is controlled by controlling the amount of opening of the intake valves.

For the control of the amount of intake air though the control of the amount of opening of the intake valves, detection of the amount of intake air via an intake amount sensor or the like is performed. However, in some states of operation of the engine, the amount of intake air detected by the intake amount sensor does not agree with the actual amount of intake air, due to the pulsation of air preceding the suction into the combustion chambers or a response delay of the intake amount sensor. Therefore, in the technology described in the aforementioned patent literature, the amount of intake air is determined through a calculation based on the closing timing of the intake valves and the engine rotation speed.

Thus, in the case where the amount of intake air is controlled by controlling the amount of opening of the intake valves, the amount of intake air detected by via an intake amount sensor or the like may deviate from the actual amount of intake air, depending on the state of operation of the engine. That is, in order to accurately detect the amount of intake air in the case where the amount of intake air is controlled through the control of the amount of opening of the intake valves, it is necessary to detect the amount of intake air by a measure other than the detection via such a sensor as an intake amount sensor or the like. Accordingly, it is an object of the invention to accurately detect the amount of intake air in an internal combustion engine equipped with a variable valve actuation device.

SUMMARY OF THE INVENTION

In order to achieve the aforementioned object, a first aspect of the invention provides an internal combustion engine having a variable valve actuation device that is provided for lifting an intake valve and that is capable of varying an amount of opening of the intake valve. The variable valve actuation device is adapted to: calculate a first estimated value of an amount of intake air from a parameter regarding an operation state of the engine at a time of opening the intake valve; calculate a second estimated value of the amount of intake air from a parameter regarding the operation state of the engine at a time of closing the intake valve; and calculate an actual amount of intake air based on the first estimated value and the second estimated value. The aforementioned amount of opening of the intake valve corresponds to the maximum amount of lift of the intake valve or the working angle of the intake valve, or both in the embodiments described below.

A second aspect of the invention provides an internal combustion engine having a variable valve actuation device that is provided for lifting an intake valve and that is capable of varying an amount of opening of the intake valve. The variable valve actuation device is adapted to: calculate a first estimated value of an amount of intake air from a parameter regarding an operation state of the engine at a time of opening the intake valve; calculate a second estimated value of the amount of intake air from a parameter regarding the operation state of the engine at a time of closing the intake valve; calculate a weighting factor that indicates a weight of the estimated values of the amount of intake air on the actual amount of intake air; and calculate the actual amount of intake air based on the fist estimated value, the second estimated value and the weighting factor.

According to the second aspect of the invention, it is preferable that the variable valve actuation device calculate the weighting factor, taking into account a process of change of the parameter regarding the operation state of the engine during a period from the time of opening the intake valve to the time of closing the intake valve.

According to the second aspect of the invention, the parameter regarding the operation state of the engine may be an amount of change in a working angle of the intake valve.

According to the second aspect of the invention, the parameter regarding the operation state of the engine may be an amount of change in a maximum lift of the intake valve.

According to the second aspect of the invention, the parameter regarding the operation state of the engine may be an amount of change in closing timing of the intake valve.

According to the second aspect of the invention, the parameter regarding the operation state of the engine may be an amount of change in intake pressure.

A third aspect of the invention provides a method for calculating intake amount for an internal combustion engine including an intake valve and a variable valve actuation device that is capable of variably controlling lift of the intake valve so as to change an amount of opening of the intake valve. This method includes the steps of; calculating a first estimated value of an amount of intake air from a parameter regarding an operation state of the engine at a time of opening the intake valve; calculating a second estimated value of the amount of intake air from a parameter regarding the operation state of the engine at a time of closing the intake valve; and calculating an actual amount of intake air based on the fist estimated value and the second estimated value.

A fourth aspect of the invention provides a method for calculating intake amount for an internal combustion engine including an intake valve and a variable valve actuation device that is capable of variably controlling lift of the intake valve so as to change an amount of opening of the intake valve. The method includes the steps of: calculating a first estimated value of an amount of intake air from a parameter regarding an operation state of the engine at a time of opening the intake valve; calculating a second estimated value of the amount of intake air from a parameter regarding the operation state of the engine at a time of closing the intake valve; calculating a weighting factor that indicates a weight of the estimated values of the amount of intake air on the actual amount of intake air; and calculating the actual amount of intake air based on the first estimated value, the second estimated value and the weighting factor.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
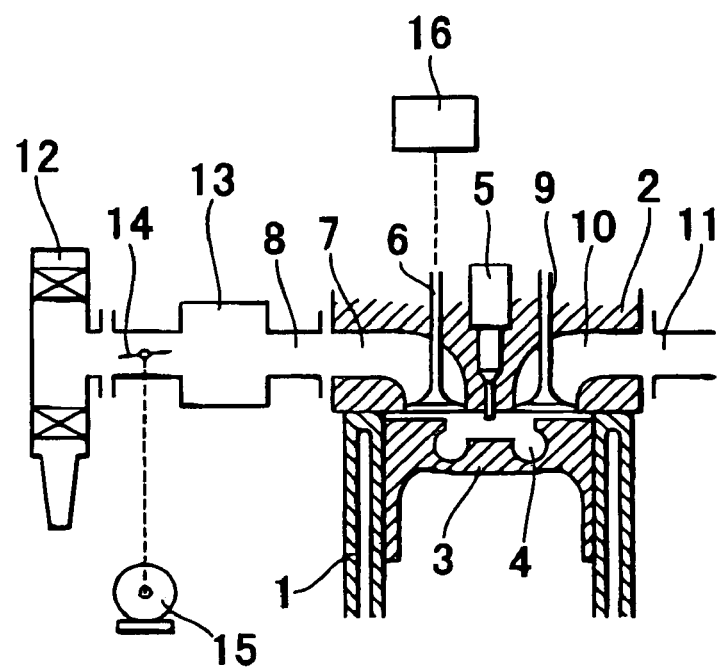
FIG. 1 is a diagram illustrating an internal combustion engine equipped with a variable valve actuation device according to an embodiment of the invention.

A preferred embodiment of the invention will be described in detail hereinafter with reference to the accompanying drawings. FIG. 1 illustrates an internal combustion engine equipped with a variable valve actuation device in accordance with an embodiment of the invention. In this embodiment, the internal combustion engine is a spark ignition type engine. However, the internal combustion engine many also be a compression ignition type diesel engine.

FIG. 1 shows a cylinder block 1, a cylinder head 2, a piston 3, a combustion chamber 4, a fuel injection valve 5, an intake valve 6, an intake port 7, an intake pipe 8, an exhaust valve 9, an exhaust port 10, an exhaust pipe 11, and an air cleaner 12. The intake pipe 8 is provided with a surge tank 13. The intake pipe 8 also has a throttle valve 14 for constrict the flow passage of the intake pipe 8. Normally, the throttle valve 14 is kept fully open. A stepping motor 15 is connected to the throttle valve 14 so that the throttle valve 14 is driven by the stepping motor 15.

Figure 2:
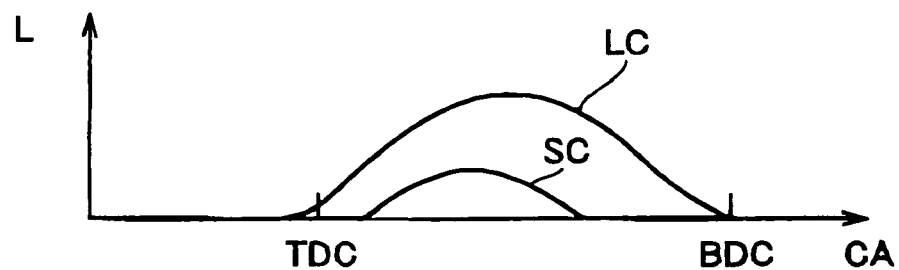
FIG. 2 is a diagram showing lift curves of an intake valve that are achievable by the variable valve actuation device of the embodiment.

A valve actuation device 16 is connected to the intake valve 6 so as to lift the valve. The valve actuation device 16 is a variable valve actuation device that is capable of varying the amount of opening of the intake valve 6 (i.e., the maximum amount of lift of the intake valve 6 and the working angle corresponding to the open valve duration of the intake valve 6) as indicated in FIG. 2. In FIG. 2, the vertical axis indicates the valve lift L, and the horizontal axis indicates the crank angle CA. A curve SC is a lift curve of the intake valve 6 where the maximum valve lift is the smallest (hereinafter, referred to as "smallest lift curve"). A curve LC is a lift curve of the intake valve 6 where the maximum valve lift is the largest (hereinafter, referred to as "largest lift curve"). The variable valve actuation device 16 is capable of continuously changing the valve lift curve between the smallest lift curve SC and the largest lift curve LC. If the lift curve is changed in the variable valve actuation device 16, the valve opening timing and the valve closing timing of the intake valve 6 change accordingly.

Figure 3:
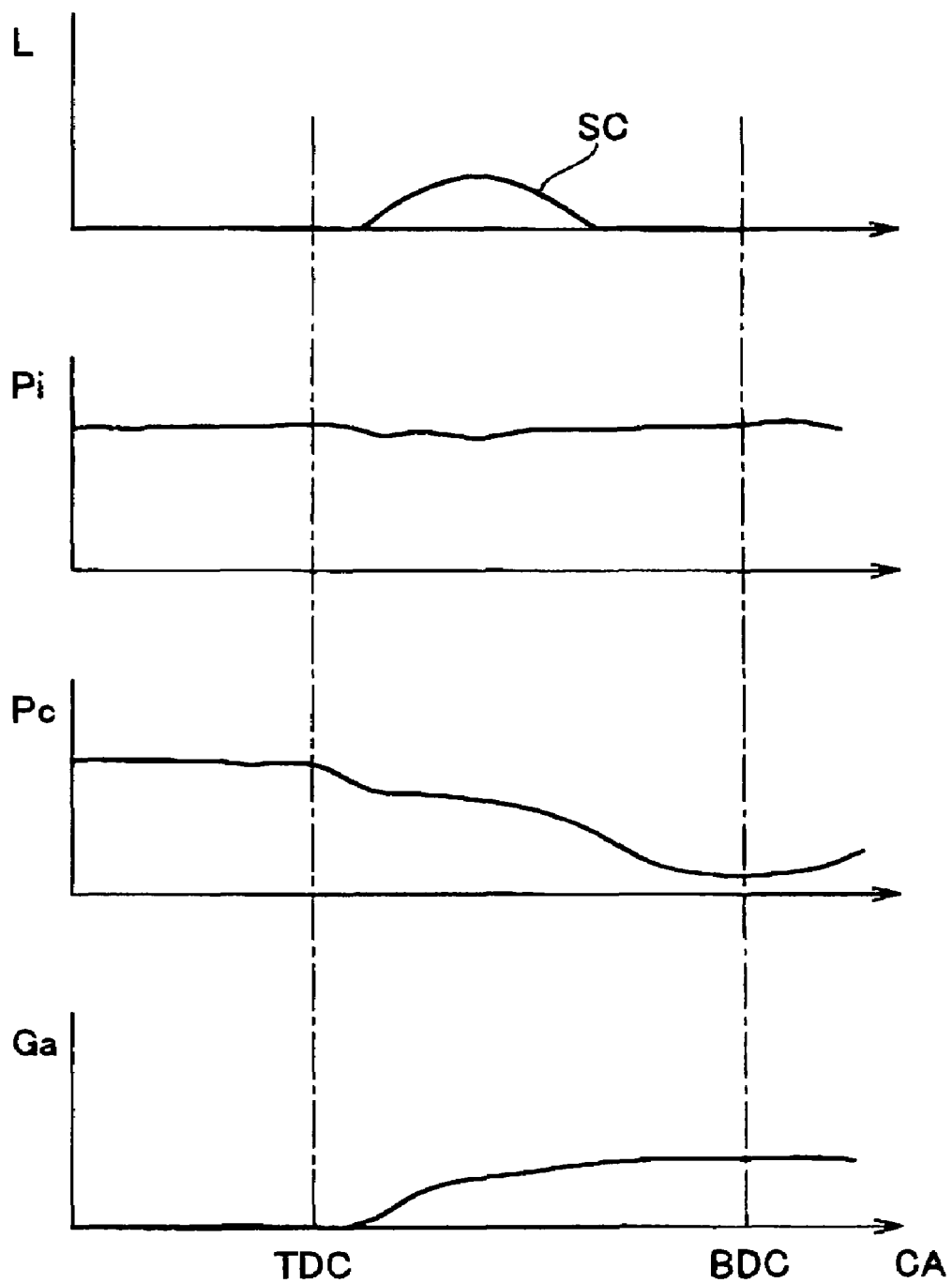
FIG. 3 is a diagram indicating transitions of the intake pressure and other quantities occurring when the intake valve is lifted in accordance with the smallest lift curve.

FIG. 3 indicates transitions of the pressure Pi in the intake pipe 8 (intake pressure), the pressure Pc in the combustion chamber 4 (in-cylinder pressure), and the amount Ga of air taken into the combustion chamber 4 (intake amount) which occur when the intake valve 6 is lifted in accordance with the smallest lift curve SC. In FIG. 3, the horizontal axis indicates the crank angle CA. In the example shown in FIG. 3, the intake valve 6 is opened at a timing immediately following the exhaust top dead center TDC, and then the valve lift gradually increases. During this process, the intake pressure Pi substantially stays at a fixed value (e.g., a value near the atmospheric pressure), and the in-cylinder pressure Pc gradually deceases. The intake amount Ga gradually increases during the process. In the example indicated in FIG. 3, the intake valve 6 is closed at a timing well before the intake bottom dead center BDC.

Figure 4:
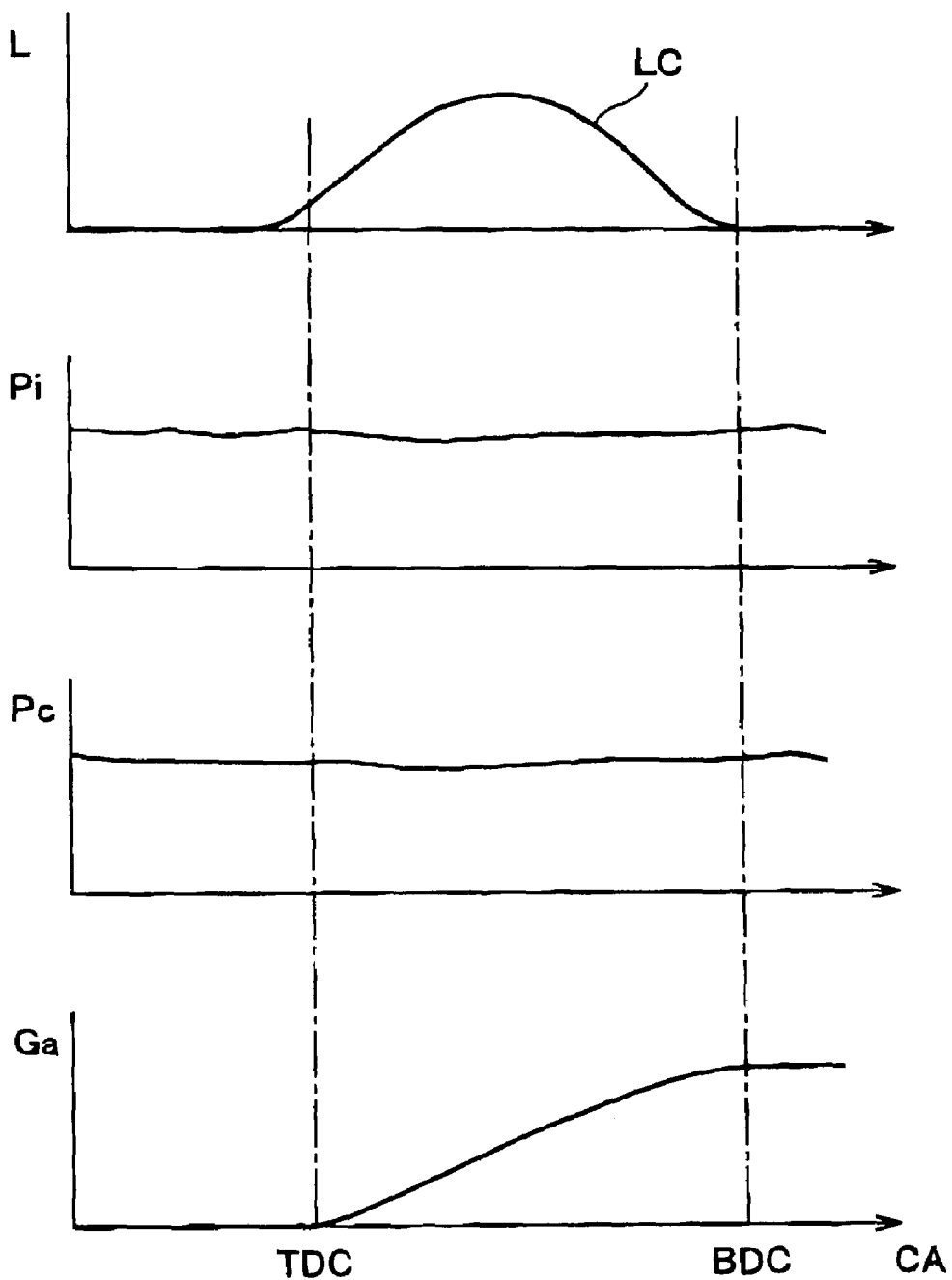
FIG. 4 is a diagram indicating transitions of the intake pressure and other quantities occurring when the intake valve is lifted in accordance with the largest lift curve.

FIG. 4 indicates transitions of the intake pressure Pi, the in-cylinder pressure Pc, and the intake amount Ga which occur when the intake valve 6 is lifted in accordance with the largest lift curve LC. In FIG. 4, the horizontal axis indicates the crank angle CA. In the example shown in FIG. 4, the intake valve 6 is opened at a timing immediately prior to the exhaust top dead center TDC, and then the valve lift gradually increases. During this process, the intake pressure Pi substantially stays at a fixed value (e.g., a value near the atmospheric pressure), and the in-cylinder pressure Pc substantially stays at a fixed value (e.g., a value near the atmospheric pressure) as well. The intake amount Ga gradually increases during the process, and reaches a value above the intake amount Ga that is finally reached in the example of FIG. 3. In the example indicated in FIG. 4, the intake valve 6 is closed at a timing near the intake bottom dead center BDC.

As is apparent from comparison between the example of FIG. 3 and the example of FIG. 4, different lift curves used to lift the intake valve 6 result in different amounts of intake air Ga.

The variable valve actuation device 16 controls the lift curve of the intake valve 6 in accordance with the engine rotation speed and the requested torque. Specifically, as the engine rotation speed increases, the variable valve actuation device 16 shifts the lift curve of the intake valve 6 toward the largest lift curve, and therefore increases the amount of opening of the intake valve 6 to increase the amount of intake air. For greater requested torques, the device 16 shifts the lift curve of the intake valve 6 toward the largest lift curve, and therefore increases the amount of opening of the intake valve 6 to increase the amount of intake air. In the invention, the amount of fuel injected from the fuel injection valve 5 (amount of fuel injection) is controlled in accordance with the amount of intake air so that the air-fuel ratio of fixture in the combustion chamber 4 reaches a desired air-fuel ratio.

In this embodiment, the amount of fuel injection is controlled in accordance with the amount of intake air as stated above. Therefore, in order to reliably adjust the air-fuel ratio of mixture in the combustion chamber 4 to a desired air-fuel ratio, it is necessary to accurately grasp the amount of intake air. It is conceivable to employ a method in which the amount of intake air is determined through a calculation based on the amount of lift of the intake valve 6 and other parameters related to engine operation. However, this method cannot always provide accurate determination of the actual amount of intake air, for example, in the case where the valve lift curve is changed as indicated in FIG. 5 or 6.

Figure 5:
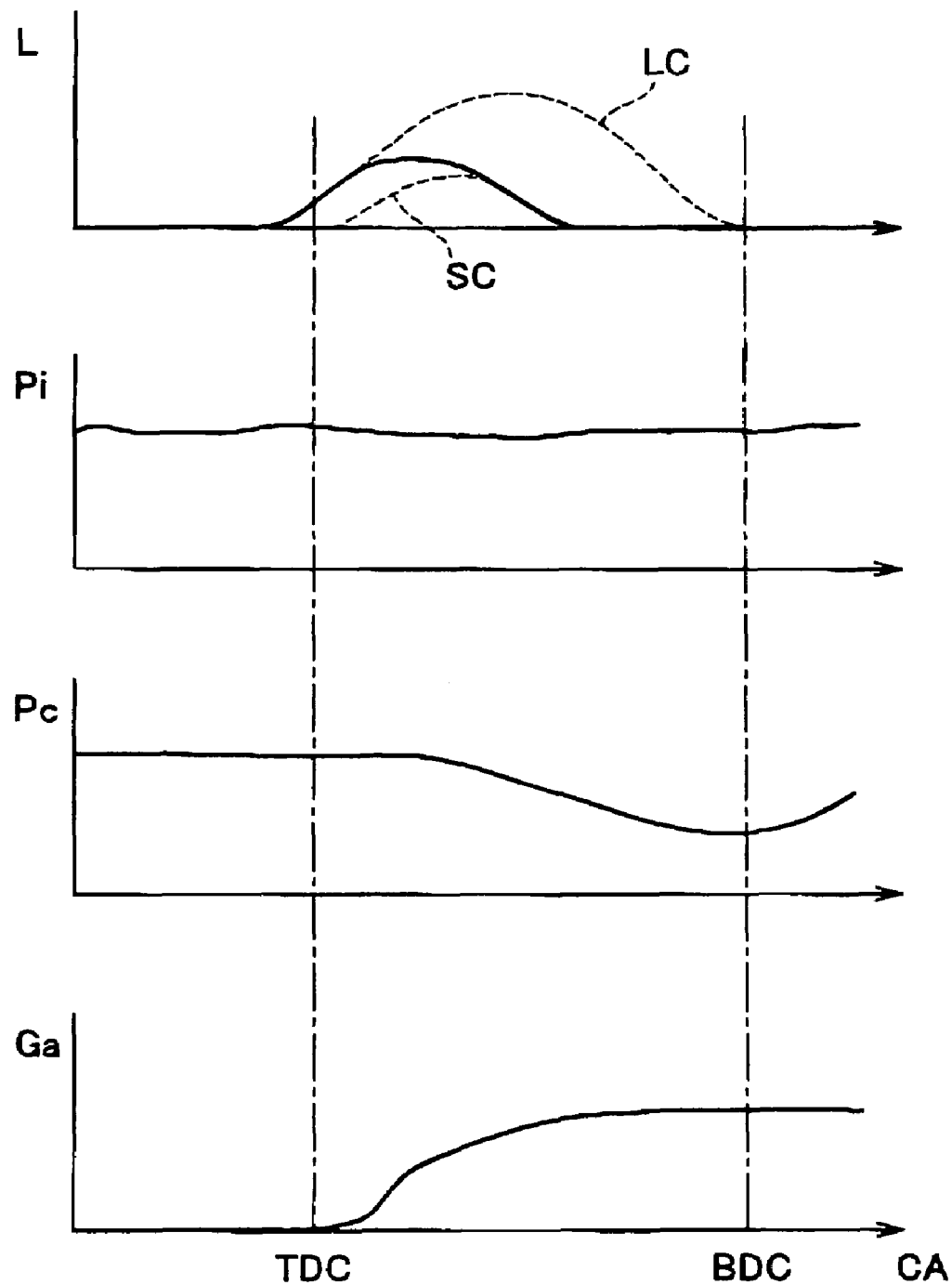
FIG. 5 is a diagram indicating transitions of the intake pressure and other quantities occurring when the lift curve of the intake valve is changed from the largest lift curve to the smallest lift curve.

FIG. 5 indicates an example case where during the intake stroke, the requested torque is reduced, and the lift curve of the intake valve 6 is changed from the largest lift curve to the smallest lift curve. In this example, the lift curve of the intake valve 6 is set at the largest lift curve at the time of opening the intake valve 6; therefore, during an initial stage of the valve lift, the intake valve 6 is lifted in accordance with the largest lift curve LC. Than, at an intermediate point in the intake stroke, the requested torque becomes small so that the lift curve of the intake valve 6 is changed from the largest lift curve LC to the smallest lift curve SC. That is, the lift curve of the intake valve 6 is gradually changed toward the smallest lift curve SC, and during an end stage, the lifting of the intake valve 6 is performed in accordance with the smallest lift curve SC. Therefore, in this example, the intake valve 6 is lifted in accordance with a lift curve indicated by a solid line in FIG. 5.

Figure 6:
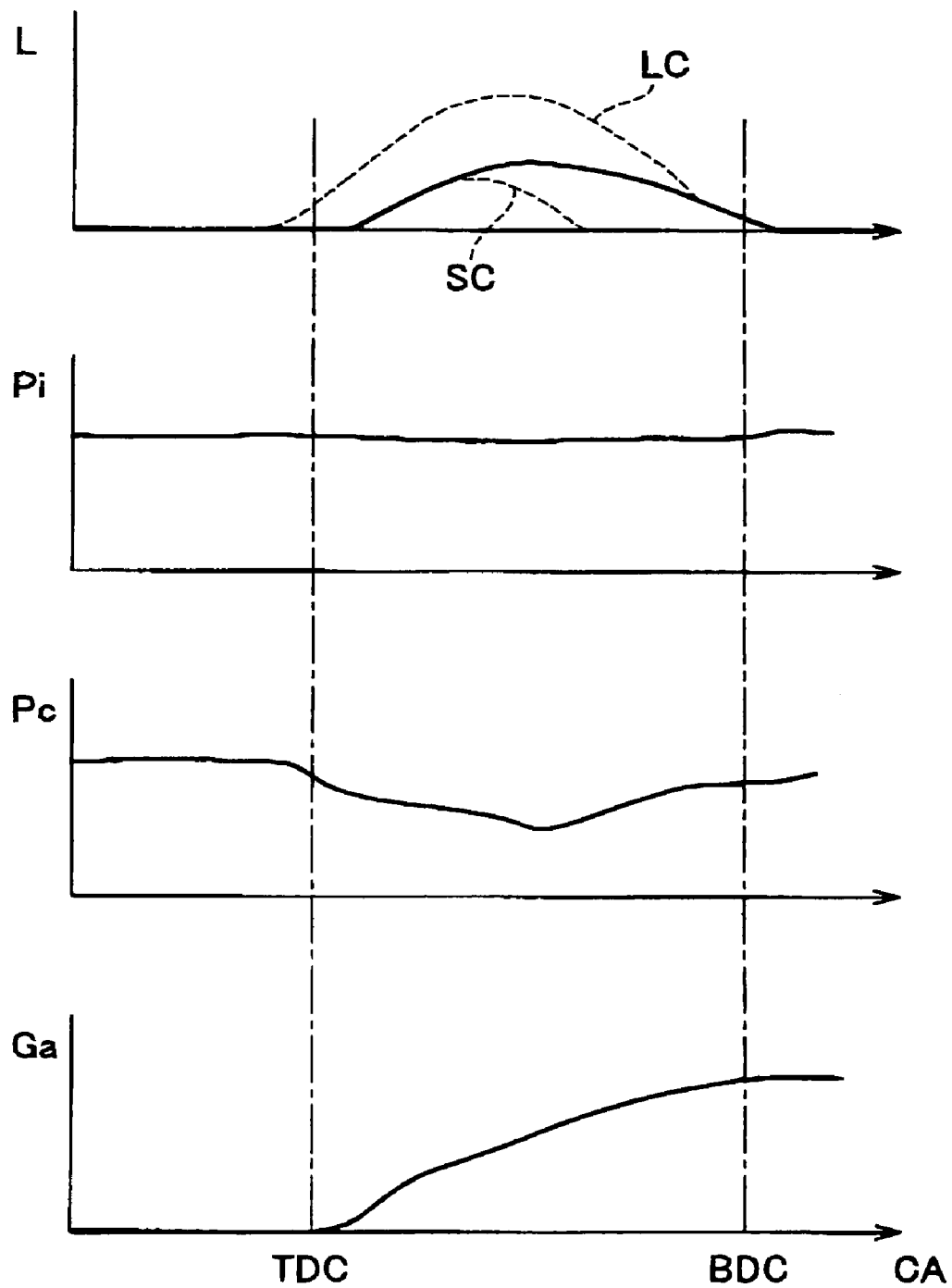
FIG. 6 is a diagram indicating transitions of the intake pressure and other quantities occurring when the lift curve of the intake valve is changed from the smallest lift curve to the largest lift curve.

FIG. 6 indicates an example case where during the intake stroke, the requested torque is increased, and the lift curve of the intake valve 6 is changed from the smallest lift curve to the largest lift curve. In this example, the lift curve of the intake valve 6 is set at the smallest lift curve at the time of opening the intake valve 6; therefore, during an initial stage of the valve lift, the intake valve 6 is lifted in accordance with the smallest lift curve SC. Then, at an intermediate point in the intake stroke, the requested torque becomes large so that the lift curve of the intake valve 6 is changed from the smallest lift curve SC to the largest lift curve LC. That is, the lift curve of the intake valve 6 is gradually changed toward the largest lift curve LC, and during an end stage, the lifting of the intake valve 6 is performed in accordance with the largest lift curve LC. Therefore, in this example, the intake valve 6 is lifted in accordance with a lift curve indicated by a solid line in FIG. 6.

In the lift curve (the amount of opening) of the intake valve 6 changes as indicated in FIGS. 5 and 6, calculation of the intake amount from the lift curve set at the time of opening the intake valve 6 does not provide a true intake amount. A true amount of intake air can be calculated by employing a method in which a precise lift curve (amount of opening) of the intake valve 6 is determined, and then is used for the calculation. However, this method is very complicated.

In this embodiment, therefore, when the intake valve 6 is opened, the amount of intake air expected to enter the combustion chamber 4 dozing the present intake stroke is calculated as a first estimated value on the basis of at least one of parameters related to the present state of operation of the engine (hereinafter referred to as "engine operation parameters"), that is, the present set amount of opening of the intake valve 6 (i.e., the maximum lift of the intake valve 6, or the working angle of the intake valve 6, or both), the opening timing of the intake valve 6, the present intake pressure, and the present engine rotation speed.

Then, when the intake valve 6 is closed, the amount of intake air considered to have entered the combustion chamber 4 during the present intake stroke is calculated as a second estimated value on the basis of at least one of the present engine operation parameter, that is, the present set amount of opening of the intake valve 6 (i.e., the maximum lift of the intake valve 6, or the working angle of the intake valve 6, or both), the closing timing of the intake valve 6, the present intake pressure, and the present operation state of the engine.

Then, a weighting factor indicating the degree of effect (weight) of the two estimated values on the actual amount of intake air is calculated on the basis of the difference between the engine operation parameter at the time of opening of the intake valve 6 and the engine operation parameter at the time of closing the intake valve 6, that is, the amount of change in the engine operation parameter, through the use of relationships indicated in FIGS. 7 and 8. On the basis of the weighting factor, the first estimated value and the second estimated value, the actual amount of intake air is calculated as in the equation: $Ga = Gao + (Gac - Gao) \times K$ where $Ga$ is the actual amount of intake air, and $Gao$ is the first estimated value, and $Gac$ is the second estimated value, and $K$ is the weighting factor. According to the invention, the weighting factor $K$ is calculated, taking into account the process of change of the engine operation parameter during the period from the time of opening the intake valve 6 to the time of closing the intake valve 6. In this embodiment, the weighting factor $K$ is a mean value of four weighting factors $K1$ to $K4$ determined from FIGS. 7 and 8.

Therefore, according to this embodiment, the actual amount of intake air can be accurately grasped even if the lift curve of the intake valve 6 is changed during the intake stroke.

Figure 7A:
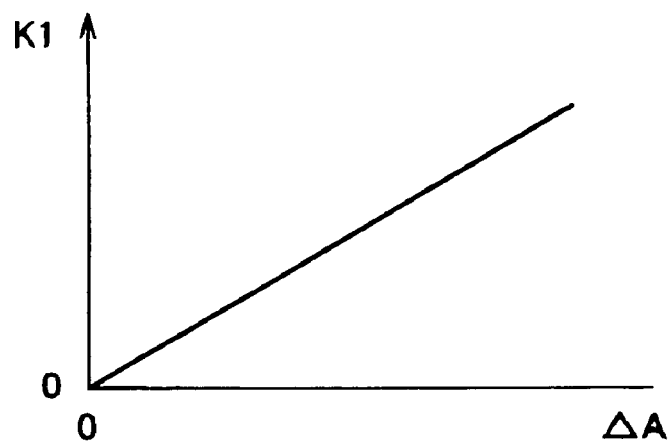
FIG. 7A is a diagram indicating a relationship for the purpose of calculating a weighting factor with respect to the amount of change in the working angle during an intake stroke.

FIG. 7A indicates a relationship between the amount of change $\Delta A$ in the working angle of the intake valve 6 and the weighting factor $K1$. As indicated in FIG. 7A, the weighting factor $K1$ is zero if the amount of change $\Delta A$ in the working angle is zero, that is, if the working angle does not change at all. In this case, the amount of intake air $Ga$ is equal to the first estimated value $Gao$ defined from the engine operation parameter at the time of opening of the intake valve 6, as can be understood from the aforementioned equation. If the amount of change $\Delta A$ in the working angle increases, the weighting factor $K1$ increases. In this case, the amount of intake air $Ga$ approaches the second estimated value $Gac$ determined from the engine operation parameter occurring at the time of closing the intake valve 6, as can be understood from the aforementioned equation.

Figure 7B:
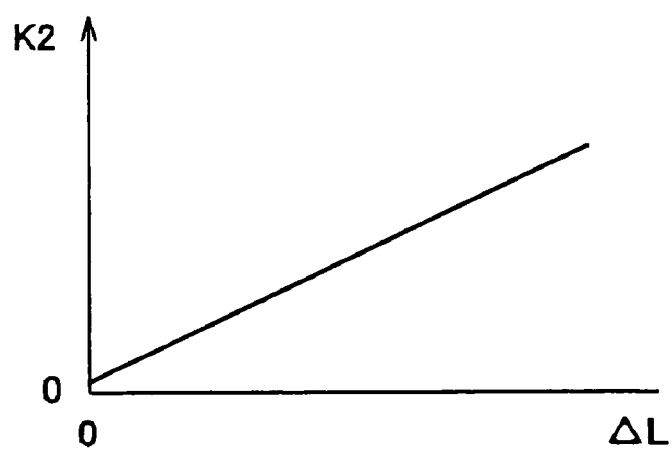
FIG. 7B is a diagram indicating a relationship for the purpose of calculating a weighting factor with respect to the amount of change in the maximum lift of the intake valve during an intake stroke.

FIG. 7B indicates a relationship between the amount of change $\Delta L$ in the maximum lift of the intake valve 6 and the weighting factor $K2$. As indicated in FIG. 7B, the weighting factor $K2$ is zero if the amount of change $\Delta L$ in the maximum valve lift is zero, that is, if the maximum valve lift does not change at all. In this case, the amount of intake air Ga is equal to the first estimated value Gao, as can be understood from the aforementioned equation. If the amount of change ΔL in the maximum valve lift increases, the weighting factor K2 increases. In this case, the amount of intake air Ga approaches the second estimated value Gac, as can be understood from the aforementioned equation.

Figure 8A:
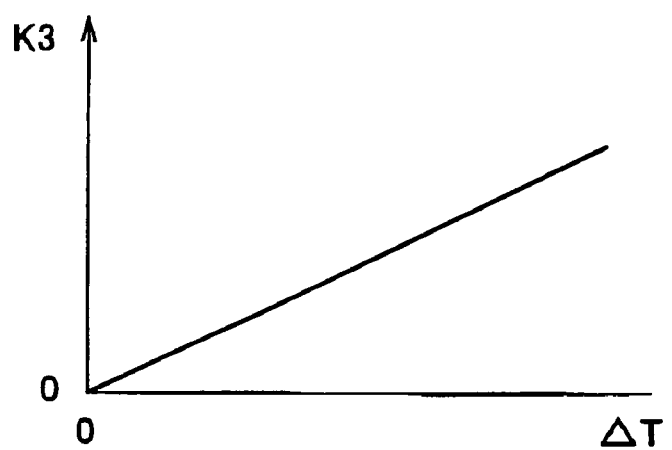
FIG. 8A is a diagram indicating a relationship for the purpose of calculating a weighting factor with respect to the amount of change in the closing timing of the intake valve during an intake stroke.

FIG. 8A indicates a relationship between the amount of change ΔT in the valve closing timing of the intake valve 6 and the weighting factor K3. As indicated in FIG. 8A, the weighting factor K3 is zero if the amount of change ΔT in the valve closing timing is zero, that is, if the valve closing timing does not change at all. In this case, the amount of intake air Ga is equal to the first estimated value Gao, as can be understood from the aforementioned equation. If the amount of change ΔT in the valve closing timing increases, the weighting factor K3 increases. In this case, the amount of intake air Ga approaches the second estimated value Gac, as can be understood from the aforementioned equation.

Figure 8B:
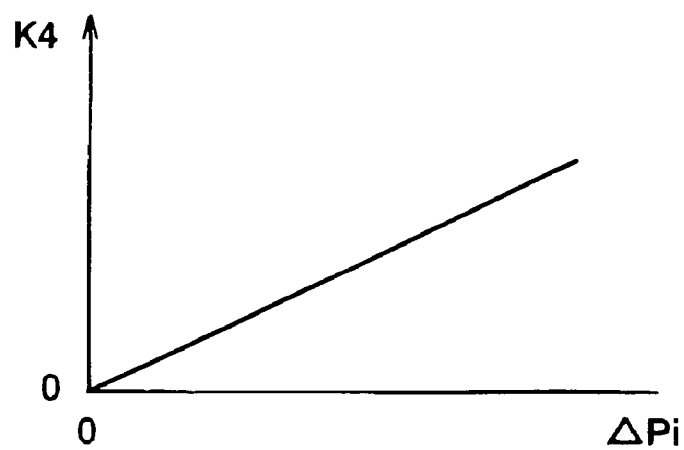
FIG. 8B is a diagram indicating a relationship for the purpose of calculating a weighting factor with respect to the amount of change in the intake pressure during an intake stroke.

FIG. 8B indicates a relationship between the amount of change ΔPi in the intake pressure and the weighting factor K4. As indicated in FIG. 8B, the weighting factor K4 is zero if the amount of change ΔPi in the intake pressure is zero, that is, if the intake pressure does not change at all. In this case, the amount of intake air Ga is equal to the fast estimated value Gao, as can be understood from the aforementioned equation. If the amount of change ΔPi in the intake pressure increases, the weighting factor K4 increases. In this case, the amount of intake air Ga approaches the second estimated value Gac, as can be understood from the aforementioned equation.

It is also possible to calculate the weighting factor K from only a selected one or more of the four weighting factors K1 to K4 calculated from FIGS. 7 and 8, rather than from all of them.

Figure 9:
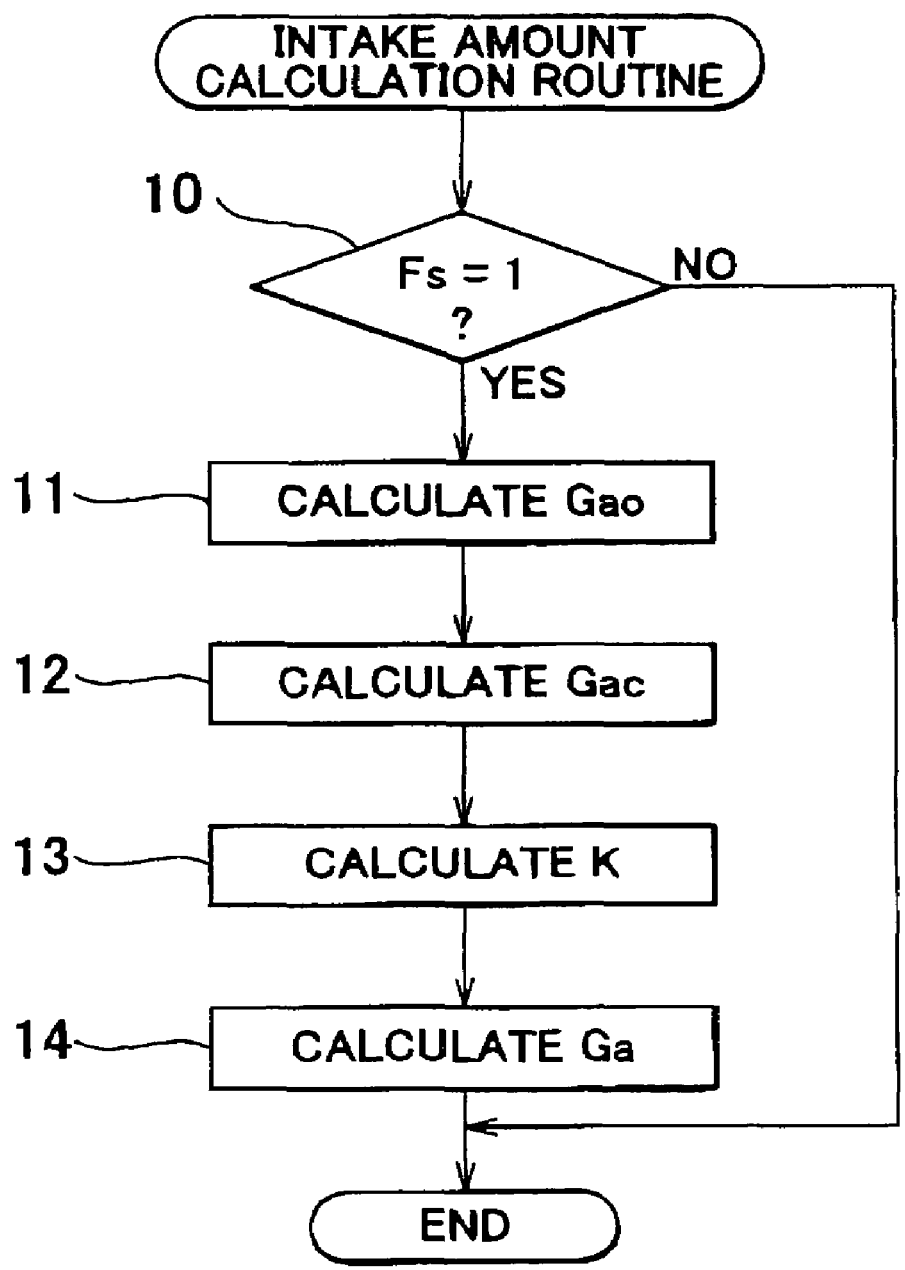
FIG. 9 is a flowchart illustrating a routine of calculating the amount of intake air in accordance with the embodiment of the invention.

FIG. 9 is a flowchart illustrating a routine of calculating the amount of intake air in accordance with the above-described embodiment. In the routine illustrated in FIG. 9, it is first determined in step 10 whether an engine startup flag Fs bas been set (Fs=1). The engine startup flag Fs is set when the internal combustion engine is started up, and is reset at the elapse of a predetermined time following the startup of the engine.

If it is determined in step 10 that Fs=0, the routine ends. Conversely, if it is determined in step 10 that Fs=1, the routine proceeds to step 11, in which the first estimated value Gao, that is, the amount of intake air expected to enter the combustion chamber 4 during the present intake stroke is calculated on the basis of the engine operation parameter occurring at the time of opening the intake valve 6.

Subsequently in step 12, the second estimated value Gac, that is, the amount of intake air considered to have entered the combustion chamber 4 during the present intake stroke is calculated on the basis of the engine operation parameter occurring at the time of closing the intake valve 6. Subsequently in step 13, the weighting factor K is calculated. Then, in step 14, the actual amount intake air is calculated as in the aforementioned equation: Ga=Gao+(Gac−Gao)×K.

According to the invention, the actual amount of intake air is calculated by the technique as described above, that is, the actual amount of intake air is calculated from an amount of intake air estimated at the time of opening the intake valve and an amount of intake air estimated at the time of closing the intake valve. Therefore, the actual amount of intake air can be accurately detected even if the lift characteristic of an intake valve change during the intake stroke.

What is claimed is:

1. An internal combustion engine comprising:
an intake valve; and
a variable valve actuation device that is capable of variably controlling lift of the intake valve so as to change an amount of opening of the intake valve, wherein
the variable valve actuation device is adapted to:
calculate a first estimated value of an amount of intake air from a first parameter regarding an operation state of the engine at a time of opening the intake valve;
calculate a second estimated value of the amount of intake air from a second parameter regarding the operation state of the engine at a time of closing the intake valve; and
calculate an actual amount of intake air based on equation (1), where:
equation (1) is: Ga=Gao+(Gac−Gao)×K,
Ga is the actual amount of intake air
Gao is the first estimated value
Gac is the second estimated value, and
K is a weighting factor.

2. An internal combustion engine comprising:
an intake valve; and
a variable valve actuation device that is capable of variably controlling lift of the intake valve so as to change an amount of opening of the intake valve, wherein
the variable valve actuation device is adapted to:
calculate a first estimated value of an amount of intake air from a first parameter regarding an operation state of the engine at a time of opening the intake valve;
calculate a second estimated value of the amount of intake air from a second parameter regarding the operation state of the engine at a time of closing the intake valve;
calculate a weighting factor that indicates a weight of the estimated values of the amount of intake air on the actual amount of intake air; and
calculate the actual amount of intake air based on the first estimated value, the second estimated value and the weighting factor,
wherein the weighting factor is based on at least one weighting sub-factor that is based on a change in one of a current set amount of opening of the intake valve, an opening timing of the intake valve, a closing timing of the intake valve, a current intake pressure, and a current engine rotation speed, from the time of opening the intake valve to the time of closing the intake valve.

3. The internal combustion engine according to claim 2, wherein the first parameter and the second parameter regarding the operation state of the engine comprise an amount of change in a working angle of the intake valve.

4. The internal combustion engine according to claim 2, wherein the first parameter and the second parameter regarding the operation state of the engine comprise an amount of change in a maximum lift of the intake valve.

5. The internal combustion engine according to claim 2, wherein the first parameter and the second parameter regarding the operation state of the engine comprise an amount of change in closing timing of the intake valve.

6. The internal combustion engine according to claim 2, wherein the first parameter and the second parameter regarding the operation state of the engine comprise an amount of change in intake pressure.

7. A method for calculating intake amount for an internal combustion engine including an intake valve and a variable valve actuation device that is capable of variably controlling lift of the intake valve so as to change an amount of opening of the intake valve, the method comprising the steps of:

calculating a first estimated value of an amount of intake air from a first parameter regarding an operation state of the engine at a time of opening the intake valve;

calculating a second estimated value of the amount of intake air from a second parameter regarding the operation state of the engine at a time of closing the intake valve; and calculating an actual amount of intake air based on the first estimated value and the second estimated value based on equation (1), where:

equation (1) is: $Ga = Gao + (Gac - Gao) \times K$,

Ga is the actual amount of intake air,

Gao is the first estimated value,

Gac is the second estimated value, and

K is a weighting factor.

8. A method for calculating intake amount for an internal combustion engine including an intake valve and a variable valve actuation device that is capable of variably controlling lift of the intake valve so as to change an amount of opening of the intake valve, the method comprising the steps of:

calculating a first estimated value of an amount of intake air from a first parameter regarding an operation state of the engine at a time of opening the intake valve;

calculating a second estimated value of the amount of intake air from a second parameter regarding the operation state of the engine at a time of closing the intake valve;

calculating a weighting factor that indicates a weight of the estimated values of the amount of intake air on the actual amount of intake air; and calculating the actual amount of intake air based on the first estimated value, the second estimated value and the weighting factor, wherein the weighting factor is based on at least one weighting sub-factor that is based on a change in at least one of a current set amount of opening of the intake valve, an opening timing of the intake valve, a closing timing of the intake valve, a current intake pressure, and a current engine rotation speed, from the time of opening the intake valve to the time of closing the intake valve.

9. The internal combustion engine according to claim 1, wherein the first parameter and the second parameter are each at least one of a current set amount of opening of the intake valve, an opening timing of the intake valve, a closing timing of the intake valve, a current intake pressure, and a current engine rotation speed.

10. The internal combustion engine according to claim 1, wherein:

K is based on a change of a third parameter regarding an operation state of the engine from the time of opening the intake valve to the time of closing the intake valve, and the third parameter is based on a change in at least one of a current set amount of opening of the intake valve, an opening timing of the intake valve, a closing timing of the intake valve, a current intake pressure, and a current engine rotation speed, from the time of opening the intake valve to the time of closing the intake valve.

11. The method according to claim 7, wherein the first parameter and the second parameter are each at least one of a current set amount of opening of the intake valve, an opening timing of the intake valve, a closing timing of the intake valve, a current intake pressure, and a current engine rotation speed.

12. The method according to claim 7, wherein:

K is based on a change of a third parameter regarding an operation state of the engine from the time of opening the intake valve to the time of closing the intake valve, and the third parameter is based on a change in at least one of a current set amount of opening of the intake valve, an opening timing of the intake valve, a closing timing of the intake valve, a current intake pressure, and a current engine rotation speed, from the time of opening the intake valve to the time of closing the intake valve.

13. The internal combustion engine according to claim 2, wherein the first parameter and the second parameter are each at least one of a current set amount of opening of the intake valve, an opening timing of the intake valve, a closing timing of the intake valve, a current intake pressure, and a current engine rotation speed.

14. The method according to claim 8, wherein the first parameter and the second parameter are each at least one of a current set amount of opening of the intake valve, an opening timing of the intake valve, a closing timing of the intake valve, a current intake pressure, and a current engine rotation speed.

* * * * *